United States Patent Office 3,268,984
Patented August 30, 1966

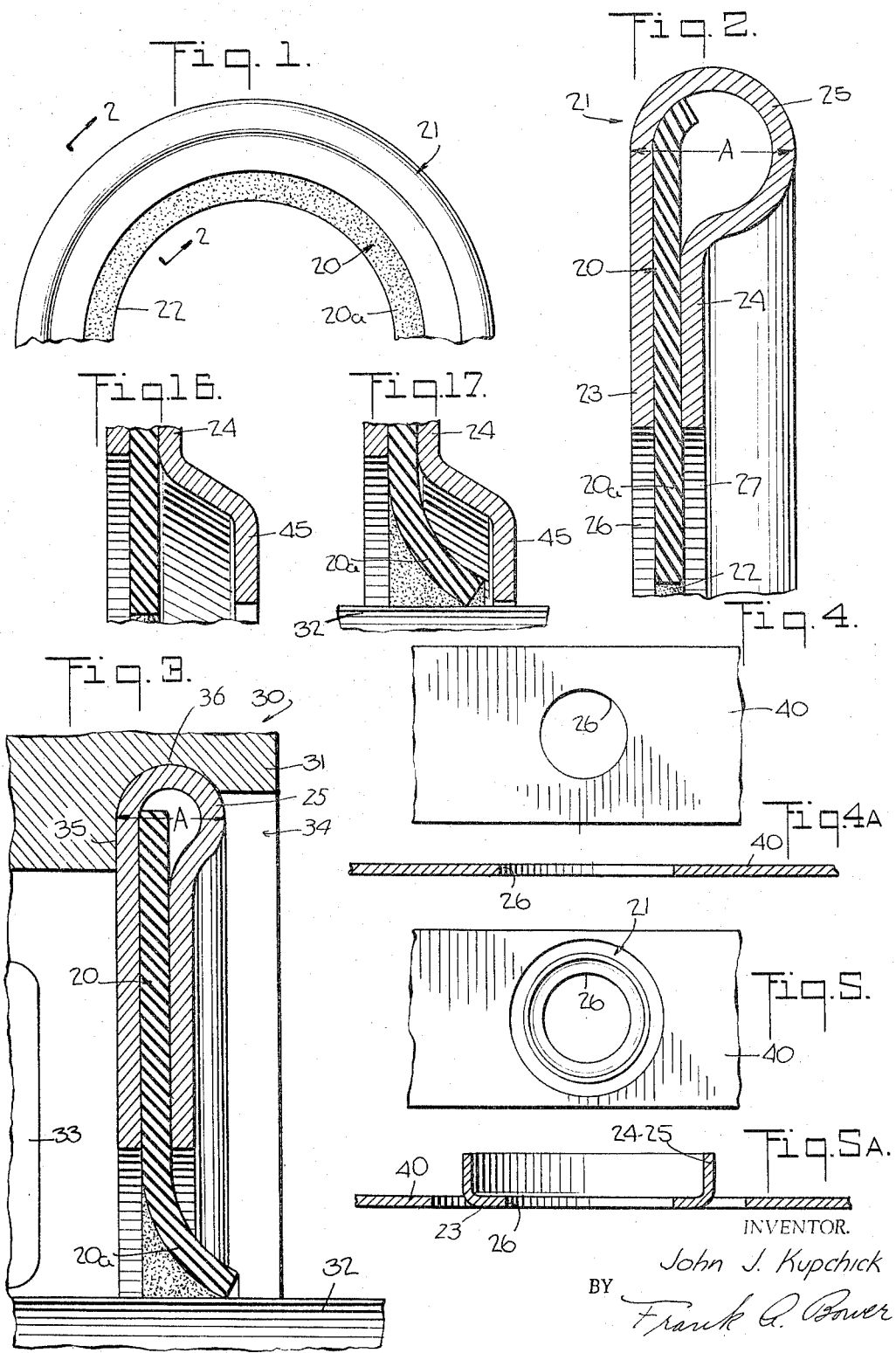

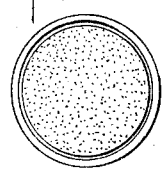
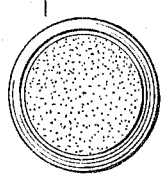
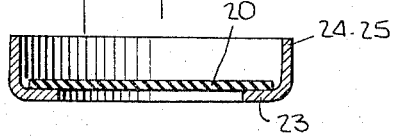
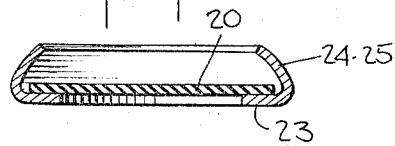
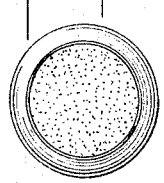
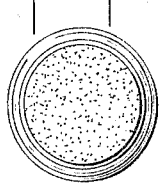
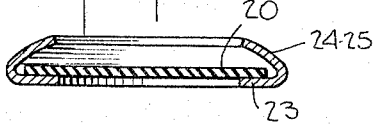
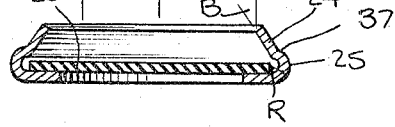
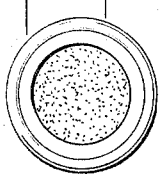
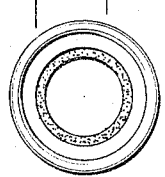
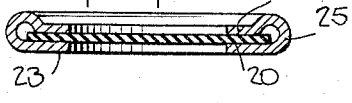
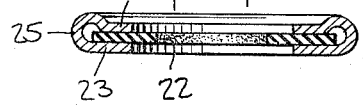
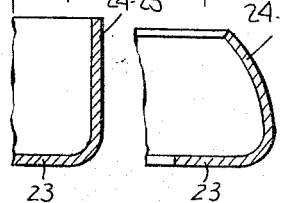
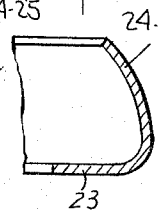
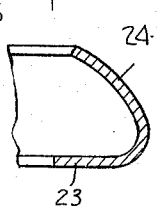
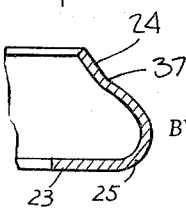

3,268,984
METHOD OF MAKING A BEARING SEAL
John J. Kupchick, Forestville, Conn., assignor, by mesne assignments, to TRW Inc., a corporation of Ohio
Filed Nov. 1, 1963, Ser. No. 320,690
2 Claims. (Cl. 29—149.5)

This invention relates to bearing seals and is directed particularly to a method of making bearing seals of the annular flexible diaphragm type. It is directed particularly to the metal support for the sealing diaphragm and the mounting of the seal in one of the relatively rotatable members of a bearing.

An object of the invention is to provide an improved method of making a flexible diaphragm type seal that has a metal ring type support mounted in sealing relation in one member of a bearing and holding the flexible diaphragm in resilient sealing relation against the other member of the bearing.

Another object of the invention is to provide a method of making an inexpensive diaphragm type seal that is easily mounted in the bearing.

Other and further objects of the invention will be apparent from the following description taken in connection with the drawings in which FIG. 1 is a full side view of an unmounted seal;

FIG. 2 is a fragmentary sectional view of the unmounted seal taken along lines 2—2 of FIG. 1;

FIG. 3 is a fragmentary sectional view of a bearing with antifriction elements with a fragmentary sectional view of the seal mounted thereon;

FIGS. 4 to 11 and 4a to 11a illustrate the steps in manufacturing the seal;

FIGS. 12 to 15 are enlarged fragmentary sectional views illustrating the successive steps of the bending of the metal blank to form the support; and FIGS. 16 and 17 illustrate another embodiment with a diaphragm protector.

Referring to FIGS. 1 and 2 of the drawings, a finished seal before mounting in the bearing is illustrated. This seal comprises a flexible diaphragm 20 of Buna "N" rubber and a ring-shaped metal support 21 of SAE 1010 dead soft steel. The rubber diaphragm 20 is circular in shape for fitting within the support 21 and has a central opening 22 for passing the other elements of the bearing or a shaft. The support 21 is formed as a single piece and essentially comprises a back flange 23, a front flange 24 and a bead 25, each extending circumferentially around the seal. The flanges 23 and 24 form circular openings 26 and 27, respectively, which are substantially greater than the opening 22 of the diaphragm. The diaphragm is positioned between the flanges 23 and 24 and extends radially inward to form a flexible portion 20a. The flanges 23 and 24 are pressed against the diaphragm to securely hold it in the metal support.

In FIG. 3 a bearing 30 is illustrated having an outer ring 31 and an inner ring 32 and antifriction elements 33. The outer ring 31 has a circumferentially extending notch 34 forming a circumferential radially extending wall 35. A groove 36 extends circumferentially and continuously to the wall 35 to form a sealing surface and for retaining the seal in the outer ring 31. The seal is positioned against the wall 35 and the bead 25 is swaged or spanked so that it is forced outwardly to recess in the groove 36. This locks the seal in the outer ring 31. As illustrated in FIG. 3 the swaging or spanking action reduces the diameter A of the bead 25. This action provides a positive locking of the seal and prevents rotation or displacement. The support 21 holds the diaphragm 20 so that the flexible portion 20a is curved to press against the inner ring 32 and form a seal therewith. The flexible portion 20a and the inner ring 32 may rotate relative to one another while maintaining the seal. The portion 20a may also be flexed inwardly towards the antifriction elements depending on whether the fluid pressure is applied from outside the bearing or from within the bearing.

The seal may be manufactured by punching the hole 26 in a continuous piece of steel 40 (FIGS. 4 and 4a). The support is then punched from the sheet 40 and turned to form the portion 24–25 at 90 degrees to the flange 23 (FIGS. 5 and 5a). The flexible diaphragm 20 may be punched from a continuous sheet of rubber in a solid form without the center opening 22 and is dropped in place on the flange 23 and within the upturned side portion 24–25 as illustrated in FIGS. 6, 6a. The portion 24–25 is then bent inwardly at an angle in two steps as illustrated in FIGS. 7, 7a, 8 and 8a to commence to form the rounded bead 25. In the next step the portion 24–25 is bent along a circular line extending around the portion 24–25 to divide it into the bead portion 25 and the flange 24. This operation determines the size of the bead 25 at a point spaced from the diaphragm 20 without disturbing the diaphragm. In the next step illustrated in FIGS. 10 and 10a, the flange 24 is bent over and pressed against the diaphragm and flange 23 to complete the formation of the bead 25 and the metal support 21. In the final operation the opening 22 is cut from the diaphragm 20.

The three operations are performed on the rubber diaphragm: the stamping of the diaphragm from a continuous rubber tape, depositing the diaphragm in the support with the upturned edge and the final stamping of the center hole 22.

The support 21 is made of a deformable metal and is formed in six separate operative steps. First, the opening 26 is punched in the sheet metal, then the support is punched from the sheet metal forming the upturned edge 24–25. The edge is then bent over in two successive operations, as illustrated in FIGS. 13 and 14. Different tools are provided for each of these operations. In the next operation illustrated in an enlarged view in FIG. 15, the bead size is determined with the annular crease 37 being critical. The flange portion 24 is at an angle B to the vertical and the semi-formed bead 25 has a radius R. The joinder of these two forms the crease 37 which is important not only in determining the size of the bead but also helps to complete the support without disturbing the diaphragm 20. In the final operation the flange 24 is pressed downward and inward against the diaphragm 20. The bead 25 has a diameter A.

Thus the seal is formed in two pieces in a simple and inexpensive manner and, as previously described, the bead is easily pressed into an annular groove for a fixed support of the seal. Since the bead and flange 23 are circumferentially continuous a fluidtight seal is formed with the surface 35 and the surface of the groove 36 of the outer ring 31. The angular portion 20a of the diaphragm 20 forms a seal against the rotating inner ring 32. The bead 25 when forced into the annular groove 36 has a diameter reduced about one-fourth from the original diameter of the bead. The flange 24 also functions as a protector of the seal from damage.

In FIGS. 16 and 17 a modification of the seal is illustrated in which the front flange 24 is extended to form a protector 45 which extends circumferentially around the seal. The protector is angulated to provide space for the curved flexible portion 20a when the seal is bearing against the shaft 32.

It is thus seen from the foregoing description that a bearing seal is provided that may be manufactured by conventional and available tools. The seal is further formed from only two single pieces while providing a secure mounting in one of the bearing rings in an economical manner. This mounting may be provided by automatic equipment. Further, the seal is protected from exterior damage by the extension of the metal support.

The invention is set forth in the appended claims.

I claim:

1. A process for manufacturing a bearing seal comprising stamping a ring-shaped flange from a sheet of deformable metal and turning a peripheral flange at 90° thereto, assembling a resilient diaphragm on said ring-shaped flange, bending the peripheral flange over and forming a peripheral curved portion, creasing the peripheral flange to form a conical-shaped portion extending inward from the curved portion and pressing the conical-shaped portion to clamp a resilient diaphragm and form a deformable peripheral bead.

2. A process as set forth in claim 1 wherein the deformable peripheral bead is swaged outwardly into a supporting groove.

References Cited by the Examiner
UNITED STATES PATENTS

| | | | |
|---|---|---|---|
| 1,941,025 | 12/1933 | Stein | 277—184 |
| 2,183,004 | 12/1939 | Boyd | 277—184 |
| 2,718,441 | 9/1955 | Smith | 277—184 |
| 3,158,923 | 12/1964 | Reinsma | 29—149.5 |
| 3,177,559 | 4/1965 | Boschi et al. | 29—149.5 |

JOHN F. CAMPBELL, *Primary Examiner.*

THOMAS H. EAGER, *Assistant Examiner.*